United States Patent
Marchioro

(10) Patent No.: US 6,959,666 B2
(45) Date of Patent: Nov. 1, 2005

(54) CORNER JOINT PARTICULARLY FOR MODULAR CAGES

(75) Inventor: Domenico Marchioro, Frazione Castelnovo (IT)

(73) Assignee: Marchioro S.p.A. Stampaggio Materie Plastiche, Isola Vicentina Frazione Castelnovo (IT)

( * ) Notice: Subject to any disclaimer, the term of this patent is extended or adjusted under 35 U.S.C. 154(b) by 0 days.

(21) Appl. No.: 10/756,330

(22) Filed: Jan. 14, 2004

(65) Prior Publication Data

US 2004/0144327 A1 Jul. 29, 2004

(30) Foreign Application Priority Data

Jan. 16, 2003 (IT) ...................................... PD2003U0004

(51) Int. Cl.[7] .................................................. A01K 1/00
(52) U.S. Cl. ..................................................... 119/452
(58) Field of Search ................................ 119/452, 453, 119/459, 461, 472, 474, 498, 499; 403/205, 231, 403, 295, 340, 305, 384, 385, 388, 389, 396, 397

(56) References Cited

U.S. PATENT DOCUMENTS

| | | | | |
|---|---|---|---|---|
| 4,205,486 A | * | 6/1980 | Guarnacci ..................... 49/501 |
| 4,525,093 A | * | 6/1985 | Moll et al. ...................... 403/4 |
| 4,900,184 A | * | 2/1990 | Cleveland .................... 403/397 |
| 4,966,487 A | * | 10/1990 | Sinkoff ......................... 403/24 |
| 5,014,861 A | * | 5/1991 | Stadtler ....................... 211/182 |
| 5,497,728 A | * | 3/1996 | Watanabe .................... 119/452 |
| 5,544,619 A | * | 8/1996 | Braun ......................... 119/474 |
| 6,460,486 B1 | * | 10/2002 | Powers et al. .............. 119/452 |
| 6,606,964 B2 | * | 8/2003 | Marchioro ................... 119/452 |

FOREIGN PATENT DOCUMENTS

| | | |
|---|---|---|
| EP | 0 466 945 | 1/1992 |
| EP | 1 234 499 | 8/2002 |
| FR | 1 246 185 | 11/1960 |

* cited by examiner

*Primary Examiner*—Son T. Nguyen
(74) *Attorney, Agent, or Firm*—Guido Modiano; Albert Josif; Daniel O'Byrne

(57) ABSTRACT

A corner joint particularly for modular cages, which is monolithic and has a substantially L-shaped body that comprises abutments inside the corner region, the transverse cross-sections of its arms being substantially H-shaped. Two channels with curled-in edges for each one of the arms are thus formed. The channels are open outward, on each arm, in opposite directions, and are capable of accommodating with reversible interlocking a total of four converging walls. The corner joint is symmetrical with respect to a central plane that is perpendicular to the converging walls.

20 Claims, 3 Drawing Sheets

CORNER JOINT PARTICULARLY FOR MODULAR CAGES

BACKGROUND OF THE INVENTION

The present invention relates to a corner joint particularly for modular cages.

Modular cages that comprise grille-like walls that are mutually connected by connecting means have been used for considerable time, successfully, in various fields of application, such as the containment of animals or plants.

Said cages have reversible connecting means constituted by coupling elements having various shapes and configurations, which however ensure the connection of two, or at the most three, converging walls (as disclosed in EPA-02003288.4 filed on Feb. 22, 2002 by this same Applicant).

However, the connecting systems normally used do not provide characteristics of flexibility in application, especially as regards the vertical extension of said modular cages.

SUMMARY OF THE INVENTION

The aim of the present invention is to provide a corner joint that allows the simultaneous association of four converging grille-like walls that are co-planar in pairs, without reducing structural solidity.

Within this aim, an object of the present invention is to provide a corner joint that can be applied simply and rapidly.

Another object of the present invention is to provide a corner joint that can also be used by personnel and/or users lacking particular technical skills.

Still, another object of the present invention is to provide a corner joint that has production costs that are competitive with respect to known models.

Yet, another object of the present invention is to provide a corner joint that can be manufactured with known technologies and facilities.

This aim and these and other objects that will become better apparent hereinafter are achieved by a corner joint particularly for modular cages, provided with a substantially L-shaped body that comprises abutments inside the corner region and in which the transverse cross-sections of the arms of said L-shaped body are contoured so as to form elastically deformable channels with curled-in edges for the insertion, with reversible interlocking, of converging walls, said joint being characterized in that said transverse cross-sections have a contour that forms two walled channels for each one of said arms, said channels being open outward in opposite directions for the insertion with reversible interlocking of a total of four converging walls.

BRIEF DESCRIPTION OF THE DRAWINGS

Further characteristics and advantages of the invention will become better apparent from the following detailed description of an embodiment thereof, illustrated by way of non-limiting example in the accompanying drawings, wherein.

DESCRIPTION OF THE PREFERRED EMBODIMENTS

Figure 1:
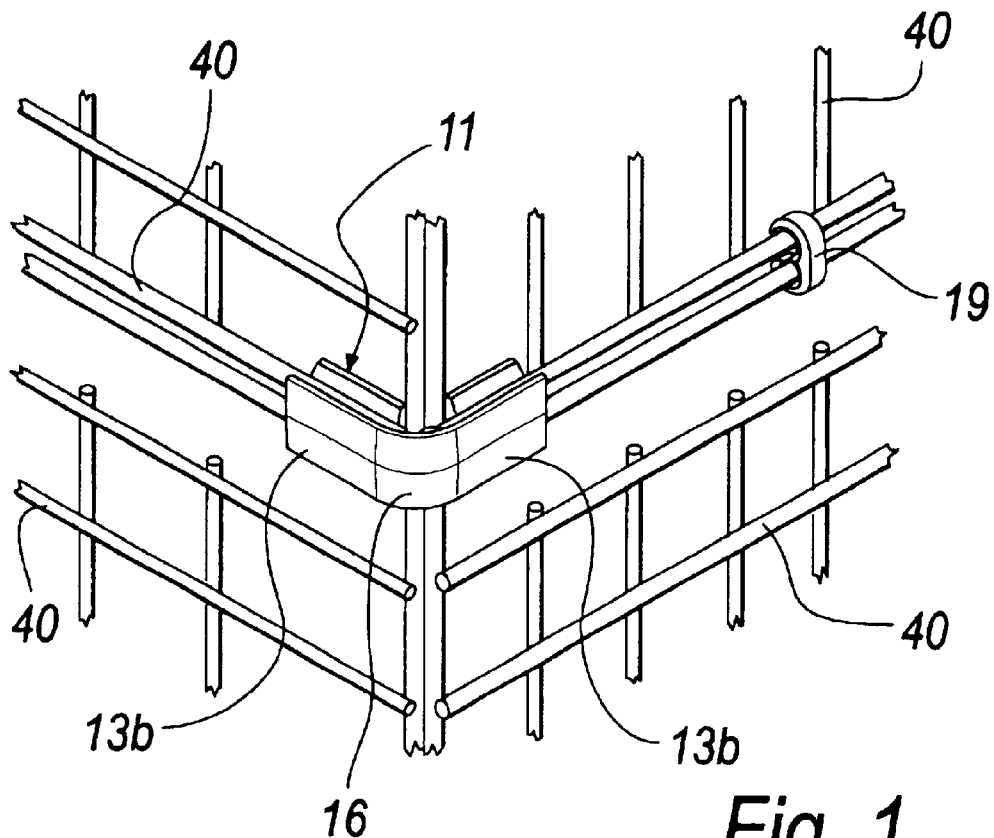
FIG. 1 is an axonometric view of the outside of a corner portion of a cage in which four converging walls are fixed to a corner joint according to the invention.
Figure 2:
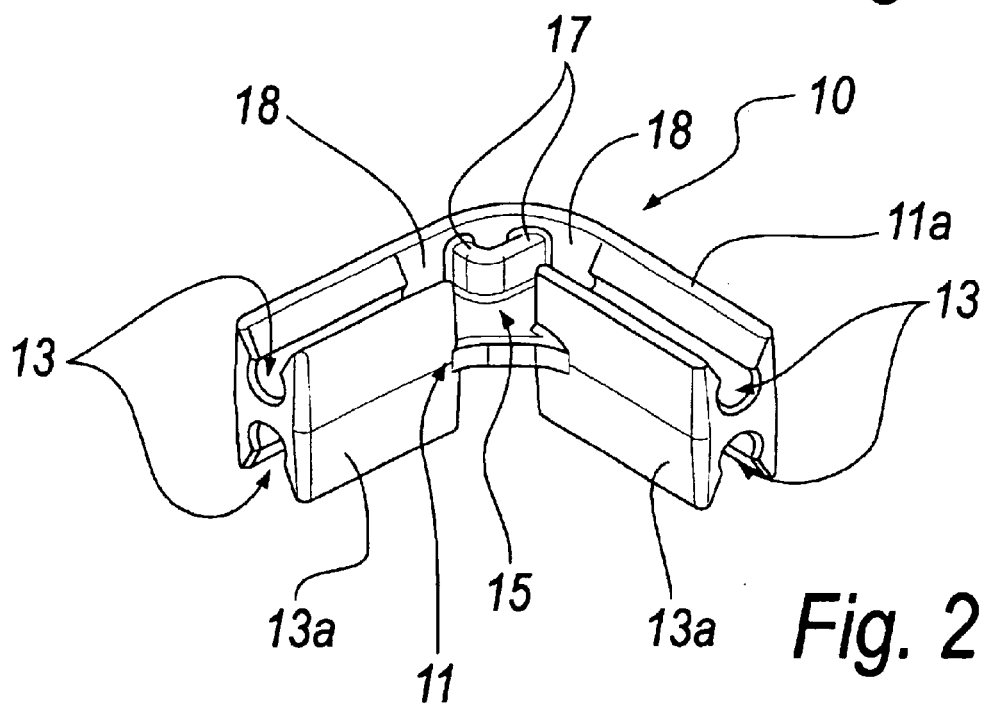
FIG. 2 is an axonometric view of a joint according to the invention.
Figure 3:
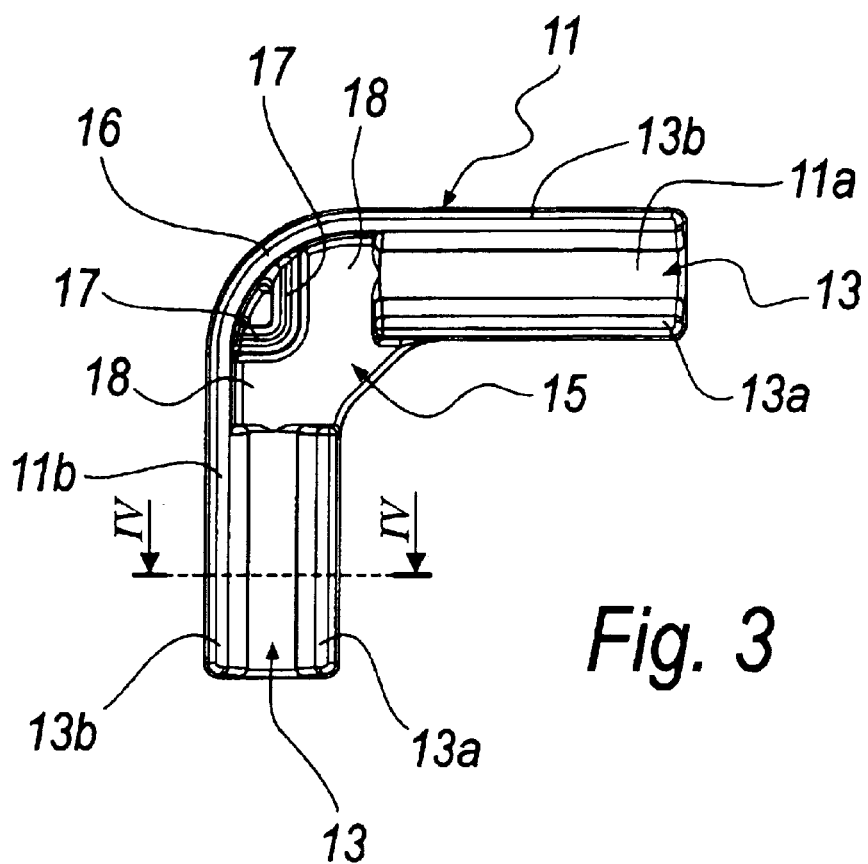
FIG. 3 is an orthographic projection view of a joint according to the invention.
Figure 5:
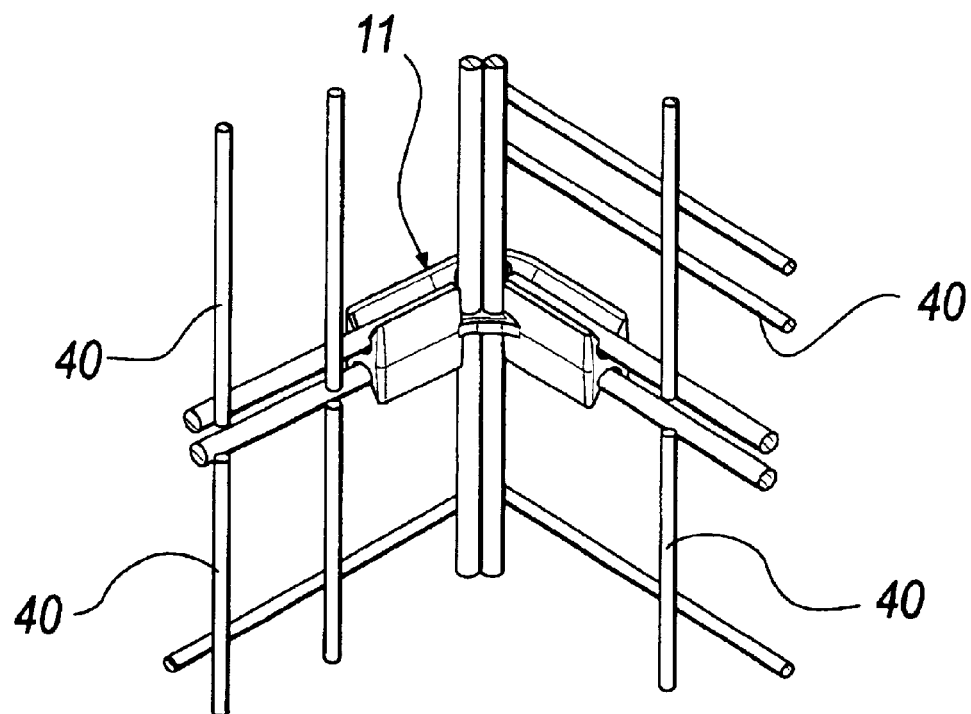
FIG. 5 is an axonometric view, taken from the inside, of the corner portion of the cage of FIG. 1.
Figure 4:
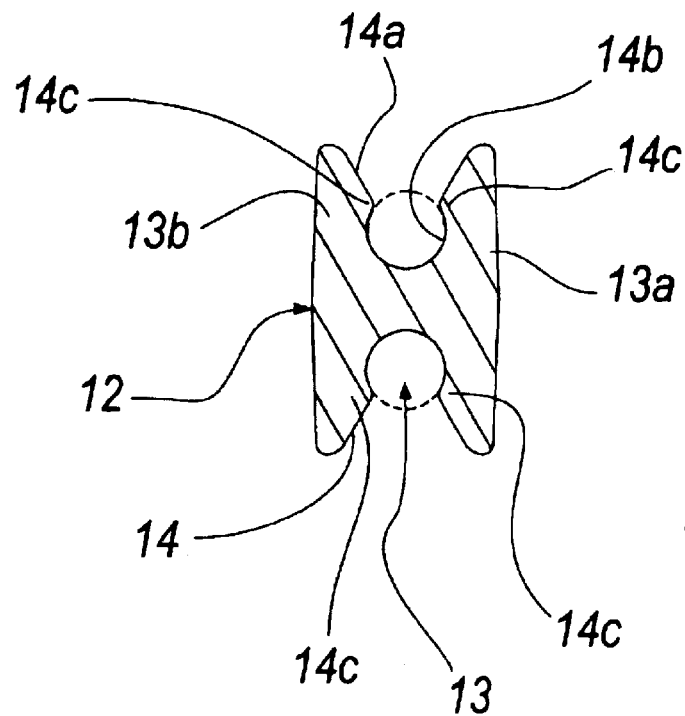
FIG. 4 is a sectional view, taken along the line IV—IV of FIG. 3.
Figure 6:
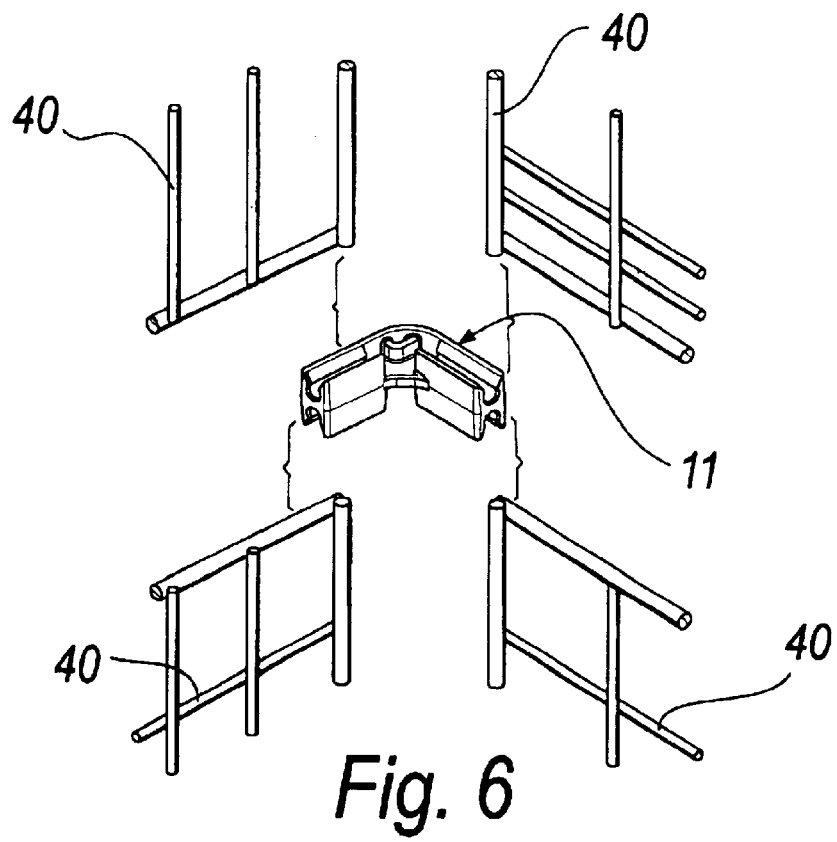
FIG. 6 is an exploded view of FIG. 5.

With reference to the figures, a corner joint according to the invention is generally designated by the reference numeral 10.

The joint 10 is provided with a substantially L-shaped body 11.

Two arms 11a and 11b can be identified on the body 11.

The transverse cross-section configuration 12 of the arms 11a and 11b is substantially H-shaped.

The cross-sections 12 lie, or are provided, substantially along at least half the length of each arm 11a and 11b of the L-shaped body 11.

This forms two channels 13 with curled-in edges for each one of the two arms 11a and 11b.

The transverse cross-sections 12 form lateral inner 13a and outer 13b wall elements on the arms 11a and 11b.

The channels 13 are delimited laterally by the lateral elements 13a and 13b and open outward in opposite directions.

In particular, the cross-sectional profile 14 of the channels 13 is composed of a first portion 14a, which tapers from the outside inward to a second substantially circular portion 14b that opens onto the first portion 14a, thereby having the overall, substantially H-shaped cross-sectional configuration 12.

The portions 14a and 14b meet so as to form ridges 14c.

The distance between the vertices of the ridges 14c is smaller than the diameter of the substantially circular portion 14b.

Accordingly, the ridges 14c lock in the channels 13 the horizontal perimetric elements of converging grille-like walls 40.

The lateral elements 13a and 13b of the channels 13 are elastically deformable, allowing the insertion with reversible interlocking of the converging walls 40.

Reinforcement ribs that form abutments 17 are provided in a corner region 15 internally with respect to the outer curved reinforcing wall 16.

The curved wall 16 connects the outer lateral elements 13b of the channels 13 with curled-in edges externally to the corner region 15, reinforcing the joint 10 and improving its design.

The channels with curled-in edges 13 and the abutments 17 form, in the corner region 15, seats 18 for accommodating vertical perimetric elements of the converging walls 40.

The joint 10 is symmetrical with respect to a central plane that is perpendicular to the converging walls 40.

The joint 10 is monolithic.

In order to optimize the assembly of the converging walls, double snap-acting hooks 19 are used.

Such double hooks 19, arranged in the points of substantially greater spacing between two adjacent perimetric elements that belong to two separate converging walls 40, contain the overall splaying of the cage and reduce the flexural and torsional stresses to which the corner joint 10 according to the invention is subjected.

In practice it has been found that the intended aim and objects of the present invention have been achieved.

In particular, it should be noted that the corner joint 10 according to the invention allows the simultaneous association of four walls 40 that converge in co-planar pairs without compromising structural solidity.

Moreover, the adoption of the joint 10 according to the invention allows an ideally unlimited vertical extension of the modular cage, allowing the vertical stacking of walls 40 in series.

In practice, the materials employed may be any according to requirements, so long as they are compatible with the contingent use.

The disclosures in Italian Utility Model Application No. PD2003U000004 from which this application claims priority are incorporated herein by reference.

What is claimed is:

1. A corner joint for modular cages, having a substantially L-shaped body comprising: abutments provided inside a corner region thereof; arms protruding from said corner region that have a transverse cross-sectional shape contoured so as to form elastically deformable channels that have a transverse cross-sectional shape with a substantially H-shape configuration with curled-in edges adapted for insertion, with reversible interlocking, of converging walls of a cage; wherein each one of said arms comprises two of said deformable channels, each of which being provided with wall elements arranged so that said channels open outward and in opposite directions with respect to each other, for the insertion with reversible interlocking of four cage converging walls.

2. The corner joint of claim 1, wherein said arms with said channels with curled-in edges have each a cross-sectional shape composed of a first portion that tapers from the outside toward the inside of said channels up to a second, substantially circular, portion thereof that opens onto said first portion.

3. The corner joint of claim 2, wherein said first and second channel portions meet so as to form ridges.

4. The corner joint of claim 3, wherein said ridges are shaped so as to have respective vertices thereof in facing opposition that are separated by a distance that is smaller than a cross-sectional diameter of said second, substantially circular portion.

5. The corner joint of claim 1, being shaped symmetrical with respect to a central plane that is perpendicular to converging walls of the cage.

6. The corner joint of claim 1, made with a monolithic structure.

7. A modular cage with a corner joint that has a substantially L-shaped body and comprises: abutments provided inside a corner region thereof; arms protruding from said corner region that have a transverse cross-sectional shape contoured so as to form elastically deformable channels have a transverse cross-sectional shape with a substantially H-shaped configuration with curled-in edges adapted for insertion, with reversible interlocking, of converging walls of the cage; wherein each one of said arms comprises two deformable channels, each of which being provided with wall elements arranged so that said channels open outward and in opposite directions with respect to each other, for the insertion with reversible interlocking of four cage converging walls.

8. A corner joint for modular cages, having a substantially L-shaped body comprising: abutments provided inside a corner region thereof; arms protruding from said corner region that have a transverse cross-sectional shape contoured so as to form elastically deformable channels with curled-in edges adapted for insertion, with reversible interlocking, of converging walls of a cage; wherein each one of said arms has a cross-sectional shape composed of a first portion that tapers from the outside toward the inside of said channels up to a second, substantially circular, portion thereof that opens onto said first portion, and wherein each one of said arms comprises two said deformable channels, each oh which is provided with wall elements arranged so that the channels open outward and in opposite directions with respect to each other, for the insertion with reversible interlocking of four cage converging walls.

9. The corner joint of claim 8, wherein said channels have a transverse cross-sectional shape with a substantially H-shaped configuration.

10. The corner joint of claim 9, wherein said cross-sectional H-shaped channel configuration is provided along substantially at least half of the length of each one of said arms.

11. The corner joint of claim 10, wherein said cross-sectional H-shaped configuration comprises lateral inner and outer wall elements on each one of said arms.

12. The corner joint of claim 11, wherein said outer lateral wall elements are connected, externally to said corner region, by a curved connecting and reinforcing wall.

13. The corner joint of claim 12, wherein said channels with curled-in edges comprise abutments located at said corner region, and seats for accommodating vertical perimetric elements of converging walls of a cage.

14. The corner joint of claim 8, wherein said first and second channel portions meet so as to form ridges.

15. The corner joint of claim 14, wherein said ridges are shaped so as to have respective vertices thereof in facing opposition that are separated by a distance that is smaller than a cross-sectional diameter of said second, substantially circular portion.

16. The corner joint of claim 8, wherein said cross-sectional H-shaped channel configuration is provided along substantially at least half of the length of each one of said arms.

17. The corner joint of claim 16, wherein said cross-sectional H-shaped configuration comprises lateral inner and outer wall elements on each one of said arms.

18. The corner joint of claim 17, wherein said outer lateral wall elements are connected, externally to said corner region, by a curved connecting and reinforcing wall.

19. The corner joint of claim 18, wherein said channels with curled-in edges comprise abutments located at said corner region, and seats for accommodating vertical perimetric elements of converging walls of a cage.

20. A corner joint for modular cages, having a substantially L-shaped body comprising: abutments provided inside a corner region thereof; arms protruding from said corner region that have a transverse cross-sectional shape contoured so as to form elastically deformable channels that have a transverse cross-sectional shape with a substantially H-shaped configuration_with curled-in edges adapted for insertion, with reversible interlocking, of converging walls of a cage; and respective seats, formed at said corner regions by said deformable channels and by said abutments, for accommodating vertical perimetric elements of said converging walls; and wherein each one of said arms comprises two of said deformable channels, each of which being provided with wail elements arranged so that said channels open outward and in opposite directions with respect to each other, for the insertion with reversible interlocking of four cage converging walls.

* * * * *